United States Patent
Devriese et al.

(10) Patent No.: US 9,546,800 B2
(45) Date of Patent: Jan. 17, 2017

(54) PRESSURE VESSEL BASED TOWER STRUCTURE

(71) Applicant: ARRANGED BVBA, Bilzen (BE)

(72) Inventors: Peter Devriese, De Pinte (BE); Martin Eurlings, Bilzen (BE)

(73) Assignee: ARRANGED BVBA, Bilzen (BE)

( * ) Notice: Subject to any disclaimer, the term of this patent is extended or adjusted under 35 U.S.C. 154(b) by 0 days.

(21) Appl. No.: 14/776,063

(22) PCT Filed: Mar. 10, 2014

(86) PCT No.: PCT/EP2014/054615
§ 371 (c)(1),
(2) Date: Sep. 14, 2015

(87) PCT Pub. No.: WO2014/139967
PCT Pub. Date: Sep. 18, 2014

(65) Prior Publication Data
US 2016/0025382 A1  Jan. 28, 2016

Related U.S. Application Data

(60) Provisional application No. 61/784,147, filed on Mar. 14, 2013.

(51) Int. Cl.
*E04H 12/10* (2006.01)
*F24J 2/34* (2006.01)
(Continued)

(52) U.S. Cl.
CPC ............ *F24J 2/345* (2013.01); *E04H 7/02* (2013.01); *E04H 7/06* (2013.01); *E04H 12/30* (2013.01);
(Continued)

(58) Field of Classification Search
CPC ............ E04H 12/30; E04H 7/06; F24J 2/345; F24J 2/07; F24J 2/30
(Continued)

(56) References Cited

U.S. PATENT DOCUMENTS 5,862,800 A * 1/1999 Marko ............. F24J 2/07
126/651
8,961,101 B2 * 2/2015 Jeffus ............ F03D 7/0276
415/1

(Continued)

FOREIGN PATENT DOCUMENTS

FR       2582036 A3    11/1986
WO   2007136765 A2    11/2007
(Continued)

OTHER PUBLICATIONS

International Preliminary Report on Patentability for corresponding International PCT Application PCT/EP2014/054615, May 27, 2015.
(Continued)

*Primary Examiner* — Gregory Huson
*Assistant Examiner* — Nikhil Mashruwala
(74) *Attorney, Agent, or Firm* — Workman Nydegger (57) ABSTRACT

A tower structure with storing capacity for at least one medium is described. The tower structure comprising at least two substantially vertically oriented support structures for forming the tower structure, wherein at least one of the support structures comprises at least one constructive pressure vessel for forming the support structure. A method for building the tower structure also is disclosed. The pressure vessel based tower structure may have applications e.g. in wind mills and solar thermal towers.

15 Claims, 12 Drawing Sheets

(51) Int. Cl.

| | | |
|---|---|---|
| *E04H 12/34* | (2006.01) | |
| *E04H 7/06* | (2006.01) | |
| *E04H 12/30* | (2006.01) | |
| *F17C 1/00* | (2006.01) | |
| *E04H 7/02* | (2006.01) | |
| *F24J 2/30* | (2006.01) | |
| *H02K 7/18* | (2006.01) | |
| *F28D 20/00* | (2006.01) | |
| *F24J 2/07* | (2006.01) | |
| *F28D 7/00* | (2006.01) | |

(52) U.S. Cl.
CPC .......... *E04H 12/342* (2013.01); *E04H 12/344* (2013.01); *F03D 9/17* (2016.05); *F03D 13/20* (2016.05); *F17C 1/00* (2013.01); *F24J 2/30* (2013.01); *F28D 20/00* (2013.01); *H02K 7/1823* (2013.01); *F17C 2201/052* (2013.01); *F17C 2201/054* (2013.01); *F17C 2221/012* (2013.01); *F17C 2221/031* (2013.01); *F17C 2265/07* (2013.01); *F17C 2270/0134* (2013.01); *F24J 2/07* (2013.01); *F28D 7/00* (2013.01); *F28F 2225/02* (2013.01); *Y02E 10/728* (2013.01); *Y02E 60/15* (2013.01); *Y02E 60/321* (2013.01)

(58) Field of Classification Search
USPC .......... 126/641, 646, 619, 604; 137/560, 565
See application file for complete search history.

(56) References Cited

U.S. PATENT DOCUMENTS

| | | | |
|---|---|---|---|
| 2009/0107567 A1 | 4/2009 | Crary | |
| 2011/0010356 A1* | 1/2011 | Berard | G06F 17/30011 |
| | | | 707/707 |
| 2011/0041892 A1* | 2/2011 | Levin | H01L 31/0521 |
| | | | 136/246 |
| 2016/0147223 A1* | 5/2016 | Edwards | G05D 1/0027 |
| | | | 701/2 |

FOREIGN PATENT DOCUMENTS

| | | |
|---|---|---|
| WO | 2009097858 A1 | 8/2009 |
| WO | 2011008325 A2 | 1/2011 |
| WO | 2011032559 A2 | 3/2011 |

OTHER PUBLICATIONS

International Search Report for corresponding International PCT Application PCT/EP2014/054615, Jun. 30, 2014.

* cited by examiner

PRESSURE VESSEL BASED TOWER STRUCTURE

FIELD OF THE INVENTION

The invention relates to the field of tower structures. More specifically it relates to methods and systems for tower structures adapted for storing at least one fluid.

BACKGROUND OF THE INVENTION

The efficiency of a wind turbine is in direct relation to the height of the rotor. There are obstacles in building higher support structure, also called wind towers, due to the limitation in cranes heights and transportability of the tower parts or the cranes.

Current cranes can lift up to heights of about 100 meters, the bottom (ground) diameter of a higher wind tower will be substantially be wider, meaning that the prefabricated cylindrical tower segments also would be larger, causing a lot of difficulties in transport and handling.

The industry tried to solve these problems by using different methods. Tubular towers made from cylindrical or tapered tube sections of rolled steel, flanged or welded on top each other were suggested. Prefabricated longitudinal tube sections mounted together axially to form a tubular tower are also suggested.

Another issue with generation of energy is that the electricity demand during a 24 h day cycle is very fluctuating, studies show that the peak periods are between 10:00 to 13:00 and from 18:00 to 20:00. The low period is between 3:00 and 5:00.

Figure 2:
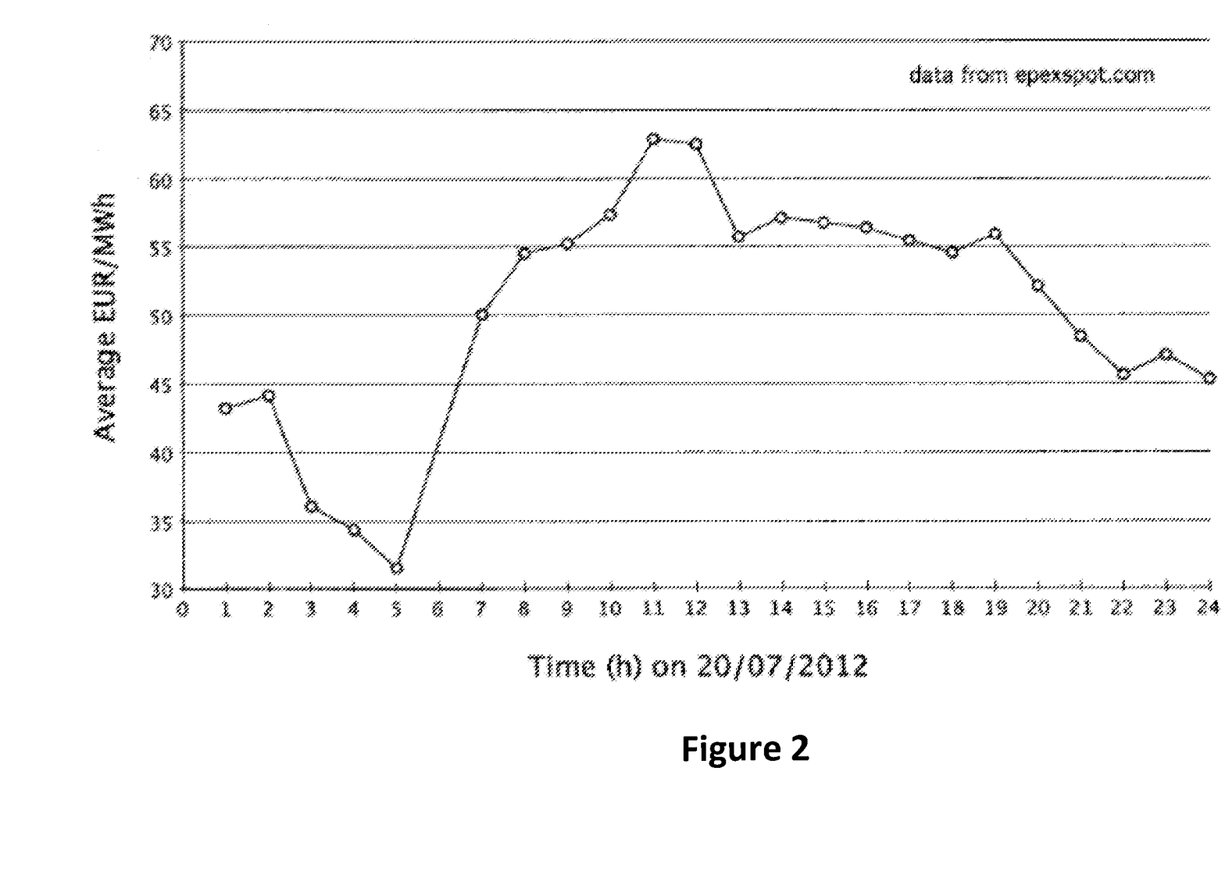
FIG. 2 illustrates the cost of electricity at different moments in time.

This is reflected in the cost per kWh. In peak moments it can be the double or triple of the low peak periods. FIG. 2 illustrate the average electricity cost at different moments in time.

The industry is working on different storage systems to store the electricity in low periods and making it available again during peak periods. For this they utilize for example pumped storage hydropower (PSH) or the CAES systems (Compressed Air Energy Systems).

Wind power is also facing the problem that in remote area (islands, deserts) where wind harvest could be very efficient the connection to the power grid is too costly and therefore not economically option.

To cope with these problems, the industry has so far presented the following methods:

WO2011/008325 describes storage of compressed air in a wind turbine support structure. It discloses a method that utilizes the support structure of a wind turbine to store compressed air. Nevertheless, the support structure implies an enormous construction resulting in high complexity. The latter is rendered even more complex in view of the high pressures that are used in the system, being indicated as up to 300 bar, as indicated in the document. The structure described is referred to as a structure made of a (one) hollow tube wherein a compressed air chamber is contained within the walls of this tube structure. The tower structures are provided such that each tower has its own compressor. The complex process of erecting the support structure with integrated storage is not discussed.

WO2011/032559 and WO2009/097858 shows methods for erecting a tower structure using longitudinal tube segments. Such a method facilitates the transport of the tower elements, but it is rather complex to assemble all the required parts at the tower's building location. It also shows a method to erect a tower by lifting the individual tube segments into position using an internal hoisting device.

WO2007/136765 shows a system for harvesting energy from wind where in the nacelle a compressor unit is installed instead of a generator. The use and production of compressed air is explained and methods are described to store the compressed gasses in natural or man-made vessels. The function of removing the heat coming from the compressors (cooling the compressor) and the possible advantages of pre-heating the compressed gas before it is expanded also is explained.

There is still a need for a system and method for storing gasses and for methods and systems for installing such storing systems.

SUMMARY OF THE INVENTION

It is an object of embodiments of the present invention to provide good methods for constructing tower constructions and corresponding tower structures.

It is an advantage of embodiments of the present invention that both the functionality of mechanical structure and the functionality of providing storage capacity for media, e.g. fluids, is obtained using constructive vessels.

It is an advantage of embodiments of the present invention that energy storage during low period can compensate or at least partly compensate during high demand periods.

It is an advantage of embodiments of the present invention that a simple solution is provided allowing to build higher tower structures than currently is possible using existing tower manufacturing methods and systems.

It is an advantage of embodiments of the present invention that tower structures or components for constructing them can be easily transported as they can be designed such that they do not exceed the size of regular truck trailers.

It is an advantage of embodiments of the present invention that the tower structure—if needed—can have a substantially wider bottom footprint, allowing it to be build on locations were the underground is not that stable, sandy or wet grounds, on land or offshore.

It is an advantage of embodiments of the present invention that the storage capacity of the tower can be easily adapted.

It is an advantage of embodiments of the present invention that the stability of the tower can be easily controlled. The latter can be done e.g. by increasing the number of legs of the tower structure.

It is an advantage of embodiments of the present invention that the constructive pressure vessels can be operated independently from the electricity generator in a wind tower, e.g. if the elements are used for forming a wind tower construction.

The above objective is accomplished by a method and device according to the present invention.

In one aspect, a tower structure with storing capacity for at least one medium, e.g. fluid or solid, is described, wherein the tower structure comprises at least two legs, e.g. at least three legs, e.g. substantially vertically oriented support elements forming part of the structure, wherein at least one of the legs and preferably all of the legs comprise at least one, e.g. a plurality, of constructive pressure vessels. In some embodiments, when a plurality of constructive pressure vessels is used, the constructive pressure vessels may be fixedly mounted to each other.

The legs may be interconnected with interconnecting beams. The interconnecting beams may comprise one or more constructive pressure vessels.

In one aspect, the present invention also relates to a method for constructing a tower structure with storing capacity for at least one medium, e.g. a fluid or a solid material, the method comprising providing a number of constructive pressure vessels for forming legs of a tower structure. The method may comprise forming legs by fixedly mounting a number of constructive pressure vessels to each other.

In one embodiment, the legs may be formed by placing constructive pressure vessels on top of already positioned constructive pressure vessels.

In another embodiment, the legs may be formed by lifting already positioned constructive pressure vessels and positioning a further constructive pressure vessel under the lifted constructive pressure vessels and thereafter connecting the constructive pressure vessels.

In one aspect, the present invention also relates to an energy storage system comprising a tower structure as described above. The tower structure may be a wind mill and/or a solar thermal tower. The system furthermore may comprise a compressor for storing compressed air in the tower structure. The compressor may at least partly be powered by wind mill energy from the wind mill and/or by solar power from the solar thermal tower. The system may comprise a pumping means, and a water turbine generator. The pumping means may at least partly be powered by wind mill energy from the wind mill and/or by solar power from the solar thermal tower. The system may comprise an external heat exchanging means.

Solar heat towers, also referred to as solar thermal towers, are used in concentrating solar power (CSP) sites using heliostatic mirrors to focus the sunlight on top of the solar heat tower, which can have heights of more than 100 meters too. According to embodiments of the present invention, the vessel tower structure thus also can be used for solar thermal towers.

Another example of energy storage systems that can benefit from the storage capacity of the tower structure are liquid electrolytes, like they are used for redox-flow batteries. Each of the electrolytes can be stored in separated CPV's or legs of the tower structure.

Particular and preferred aspects of the invention are set out in the accompanying examples. Features from the examples or embodiments may be combined with features of other embodiments or examples as appropriate and not merely as explicitly set out below.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to a leg, reference is made to a substantially vertical structure that is used for forming the tower structure.

By way of illustration, embodiments of the present invention not being limited thereto, a number of features and characteristics will further be described with reference to particular examples and embodiments, the present invention not being limited thereto.

In one aspect, the present invention relates to a tower structure with storing capacity for at least one fluid. The tower structure may comprise at least two legs, e.g. at least three legs, wherein each of the legs comprises at least one constructive pressure vessel. The legs form at least part of the tower construction. These parts may be at least the upstanding parts of the tower. When a plurality of constructive pressure vessels is used, the constructive pressure vessels may be fixedly mounted to each other to form the leg. The plurality of constructive pressure vessels may be interconnected to each other such that they act as a single vessel.

The constructive pressure vessels may for example be made of steel or steel alloys, with or without inner liner to increase corrosion resistance or to act as insulator, but are not limited thereto. Another possibility is for example that the vessels are made of composite materials.

The constructive pressure vessels, used for forming the leg, can be fixedly mounted to each other in a plurality of ways. They can for example be bolted or welded using flanges, be connected using male/female connections with or without bajonets, be connected with male/male connections with clamp or adapter pieces, or in any other suitable way. Examples of different types of connections are by way of illustration shown in FIG. 8. The clamps may be designed in a similar manner as for vacuum and/or pressure system applications.

According to some embodiments of the present invention, the constructive pressure vessels may have at least one port for filling an emptying the vessel with a medium, e.g. a fluid such as e.g. a liquid. In some embodiments, the constructive pressure vessels may be operated each in an independent way. Alternatively, different ports of the different constructive pressure vessels may be interconnected with each other. In other words, the plurality of construction vessels may in some embodiments form one larger single vessel and act as a single vessel. The constructive pressure vessels may have at least one safety valve or safety means, such as for example a burst disc, to prevent overpressure of the constructive pressure vessel, once it is used after construction of the tower.

According to some embodiments of the present invention, the constructive pressure vessel may have at least two ends (heads).

According to some embodiments of the present invention, the constructive pressure vessel may have a tubular or oval structure with a constant longitudinal width. The latter may support the mechanical stability of the system, According to some embodiments, the constructive pressure vessel may be provided internally with an internal heat exchanger. The heat exchanger may be or comprise ceramic materials.

For ease of manufacturing, the constructive pressure vessel may also have at least one lifting point, e.g. to control upside, downside and/or sideways powers during construction.

The parts, e.g. the constructive pressure vessels (CPV) can be e.g. manufactured using commercially available industrial large diameter steel piping as they are offered by for example Salzgitter Mannesmann Grossrohr, although embodiments of the present invention are not limited thereto and any vessel construction technique can be used. Available diameters for the steel piping used in the example above may be ranging from 610 mm to 1676 mm, and may in some examples have a wall thickness of the tube from 7.1 mm to 25 mm, lengths up to 18 meter. With these diameters and wall thickness one can design CPV that can hold pressures of up to 85 bar. Tubes can even be supplied with a wall thickness of more than 50 mm allowing even higher pressures.

Figure 5:
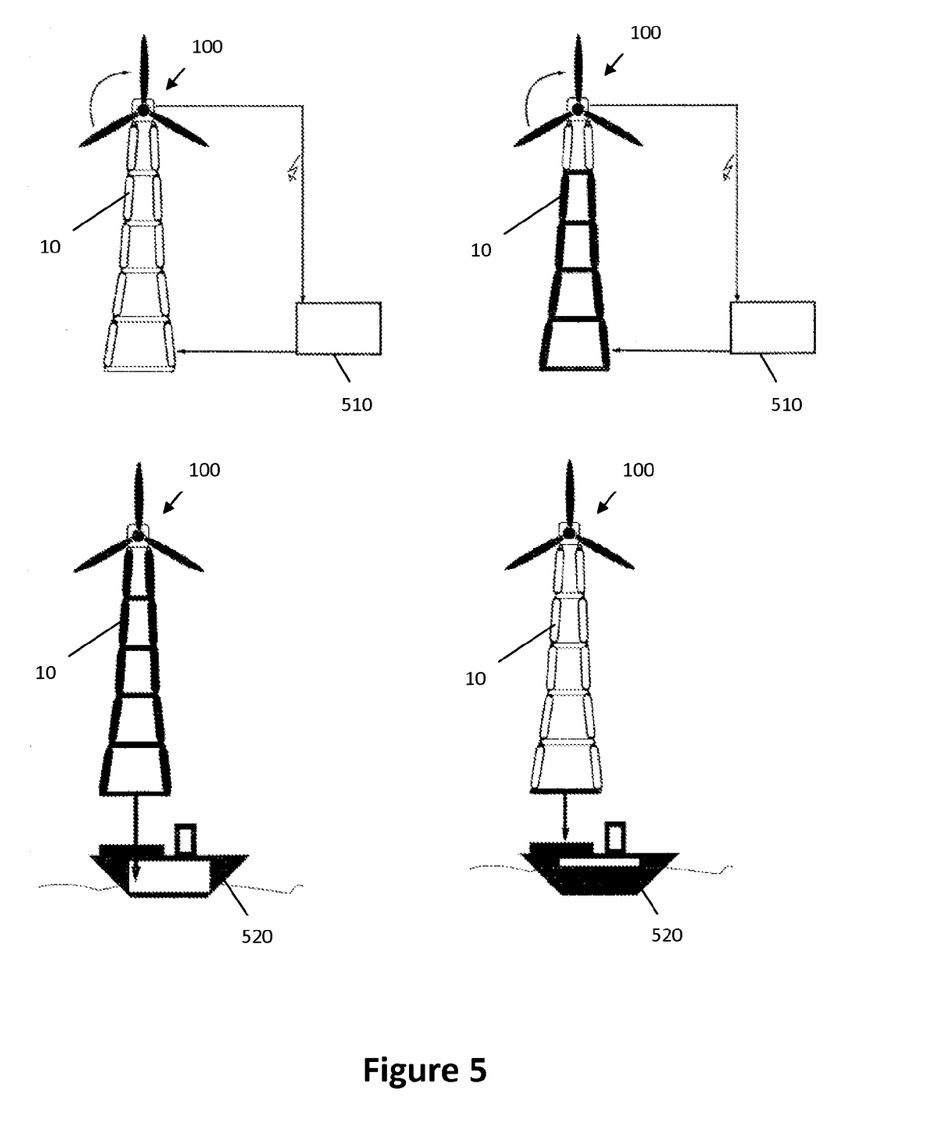
FIG. 5, FIG. 6*a* and FIG. 6*b* illustrate a method for storing and harvesting energy, according to an embodiment of the present invention.

According to embodiment of the present invention, the constructive pressure vessels may be suitable for storing gasses such as hydrogen gas or artificial gas. At a suitable moment, e.g. when the constructive pressure vessels are full, the content from the vessels could be harvested by ships or trucks and then being transported to other destinations, where the gas could be used as raw material or could be combusted into electricity or heat. An example of such towers and the method of harvesting is schematically shown in FIG. 5. In some embodiments, the hydrogen gas or artificial gas can be made through electrolysis of water into hydrogen gas and the latter can e.g. be performed using energy created by the tower, e.g. when the tower is a windtower. In FIG. 5, an electrolysis unit 510 for converting water into hydrogen is shown. Furthermore, in the bottom drawings, the harvesting by ship 520 also is shown. The latter may be an efficient way for converting and storing wind energy.

Specific elements of the wind mill, such as rotor, transmission, generator, etc. are known by the person skilled in the art and are therefor not detailed further here.

It is possible, even advantageous in some configurations, to combine in some embodiments in one tower CPV's designed for gasses and other media. In case of CAES systems, the heat that is released by compressing the air, could be stored in CPV's that are filled with a heat buffering media, e.g. a ceramics material or a liquid such as water, that can be used for storing heat, e.g. using a heat exchanger. The medium filled CPV's typically may be located at the bottom area of the tower structure, giving it even more stability. Preferably these heat storage CPV's are insulated. Alternatively, also other CPV's may be selected to be filled with a medium for heat exchanging.

Figure 6A:
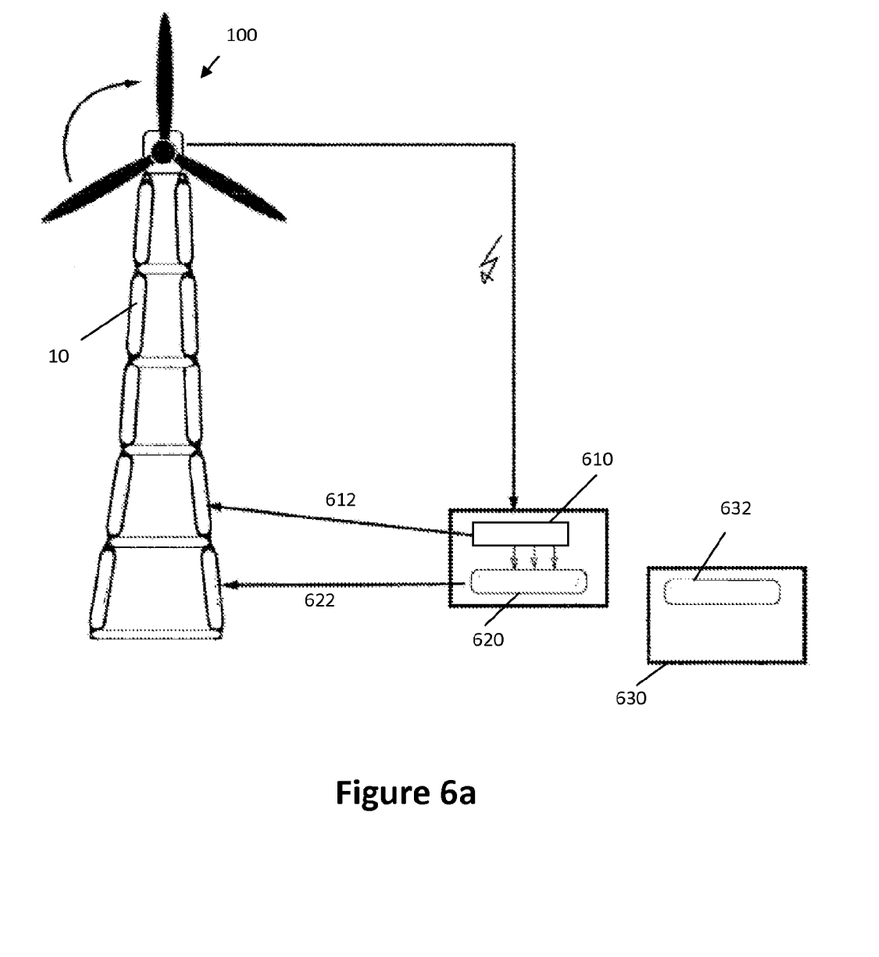
Figure 6B:
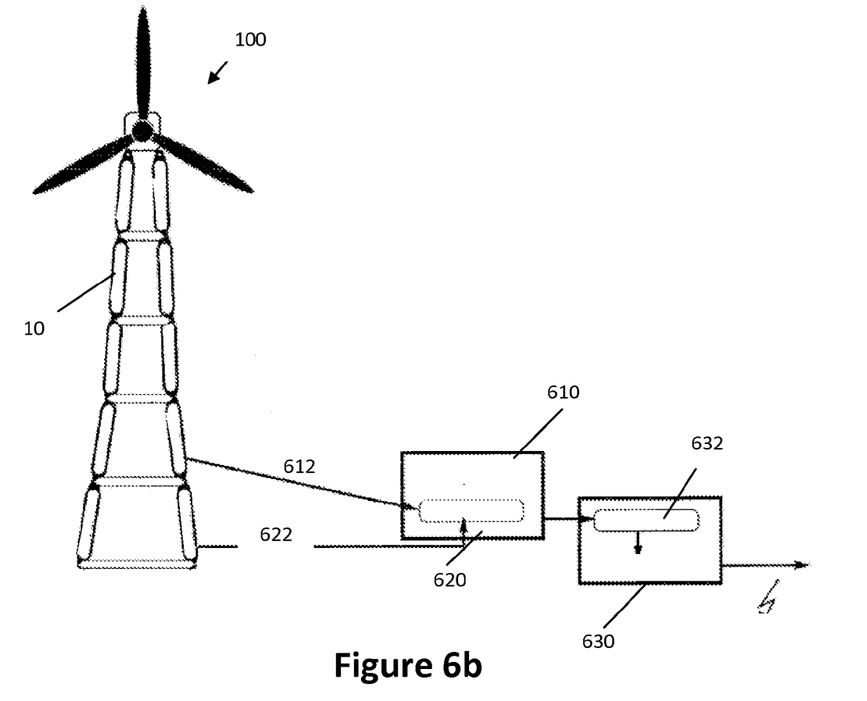

By way of illustration, embodiments of the present invention not limited thereto, an example thereof is shown in FIG. 6a. FIG. 6a shows a tower structure 100, in the present example being a wind mill, whereby energy of the wind mill is used to drive a compressor 610, providing compressed gas 612 to the vessels 10. In the bottom vessels a liquid or solid may be present and heat 622 may be transferred to the liquid or solid by a heat exchanger 620. This way the efficiency of a CAES system will drastically increase, since this heat can be used to pre-heat the compressed gas prior it is expanded to drive a turbine 632 to power the generator 630. The latter is illustrated in FIG. 6b. The systems for extracting and providing heat may be combined in a single tower.

Figure 10A:
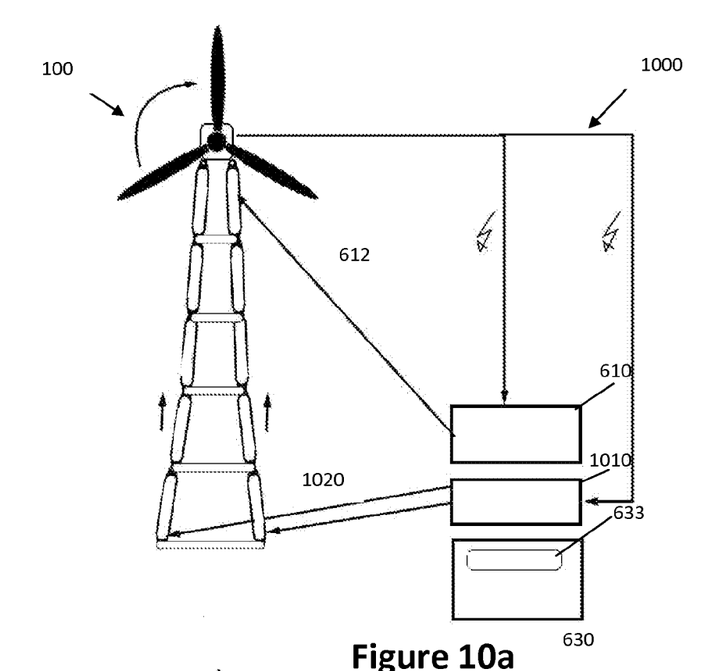
FIGS. 10*a* and 10*b* illustrate two states of an alternative energy system based on constructive pressure vessel based towers with different functionality, according to embodiments of the present invention.
Figure 10B:
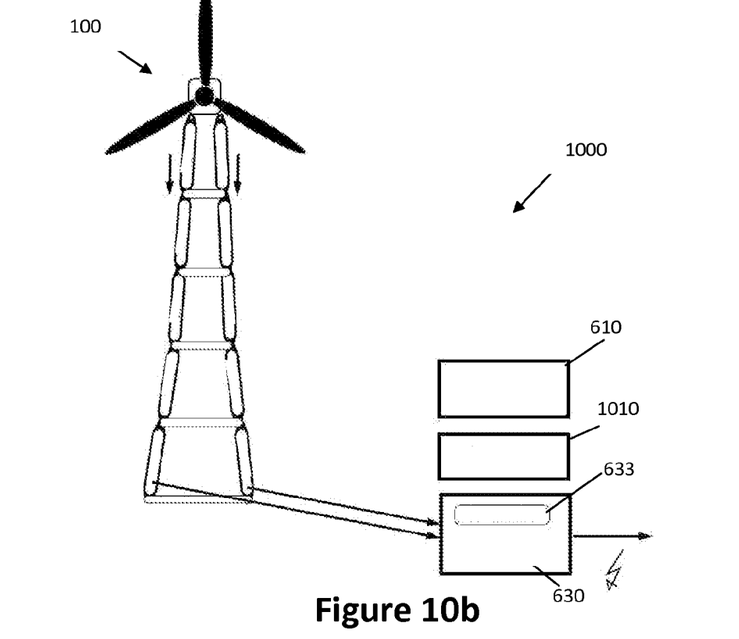

Further by way of illustration, FIG. 10a shows a system 1000 whereby a combined energy storage system is implemented. On the one hand gas, e.g. air, compression is performed making use of a wind mill configuration providing electricity for driving a compressor 610 to pressure CPV's, whereas on the other hand, the electricity generated by the wind mill is also used for pumping water into the other CPV's of the tower structure 100 using a pump system 1010. When the electricity demand is high, this configuration can be used to drive a water turbine 633 that powers a generator 630 to produce electricity, whereby the water 1020 is than optionally pressurized by a CPV that was filled with compressed air. The fact that the water filled CPV are pressurized increases the energy capacity drastically (eg when we pressurize a water filled CPV with 70 bar compressed air, it is equal to a liquid height of about 700 m. The latter is shown in FIG. 10b.

The above example illustrates that a plurality of functionalities can be introduced in the constructive vessel tower 100. As function thereof, the constructive pressure vessels, their characteristics or their use can be tuned. For example lower positioned vessels may be selected for containing water, whereas higher positioned vessels may be selected for containing compressed gasses.

Figure 11:
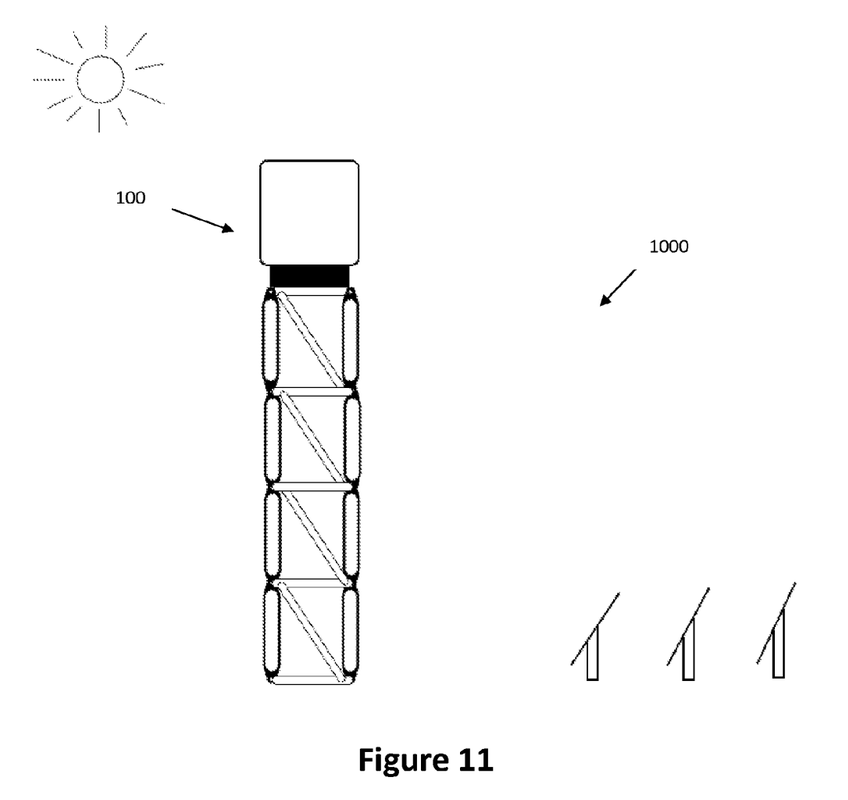
FIG. 11 illustrates a constructive pressure vessel based tower used for a solar thermal tower configuration
Figure 12:
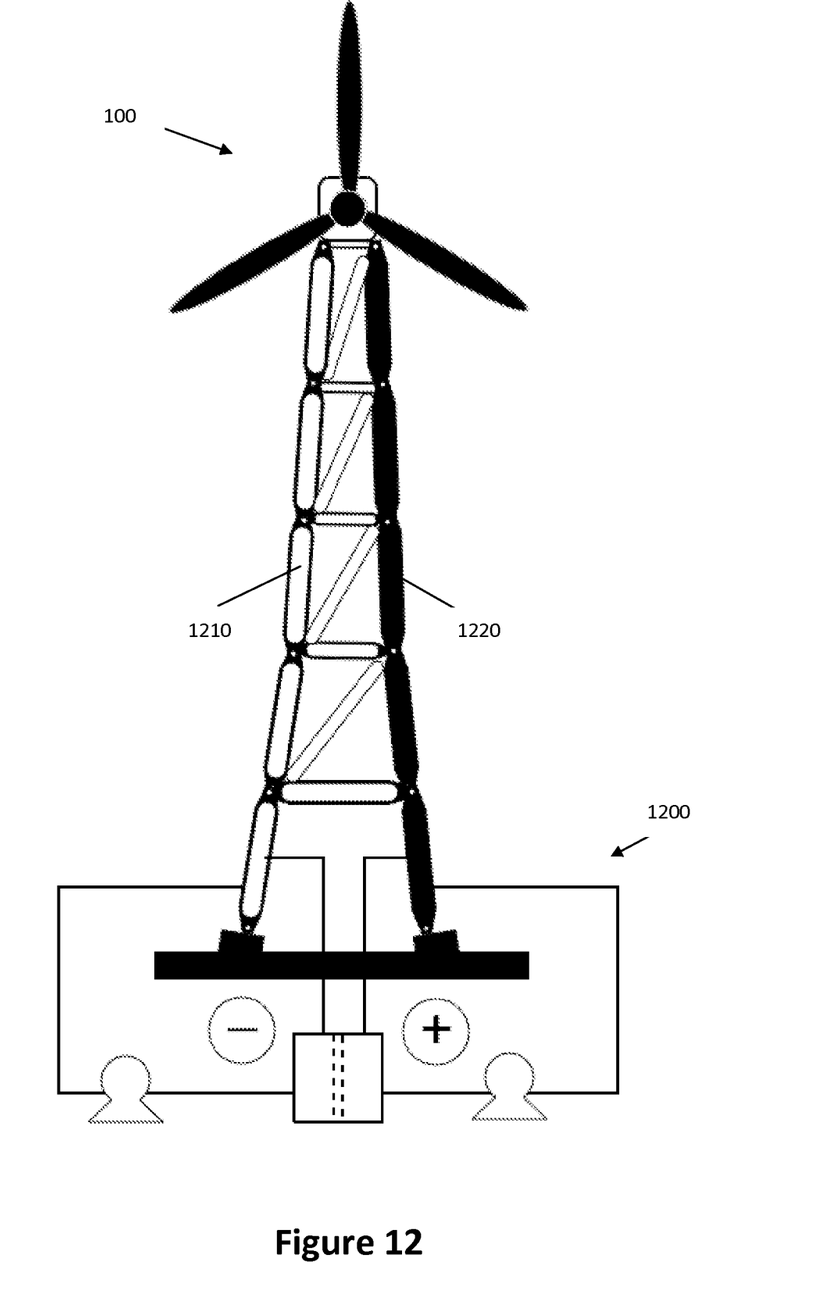
FIG. 12 illustrates a constructive pressure vessel based tower in a configuration for redox-flow battery storage and the possible storage configuration for the electrolytes.

Another example of a tower structure is shown in FIG. 11, wherein the tower structure 100 is used in a solar thermal tower. Yet another example is shown in FIG. 12, wherein the tower structure 100 is used for storing electrolytes in a configuration for redox-flow battery storage. In the example shown, different electrolytes, e.g. a first electrolyte 1210 and a second electrolyte 1220, are stored and reaction of the electrolytes allows generation of current in a battery configuration 1200.

Figure 8:
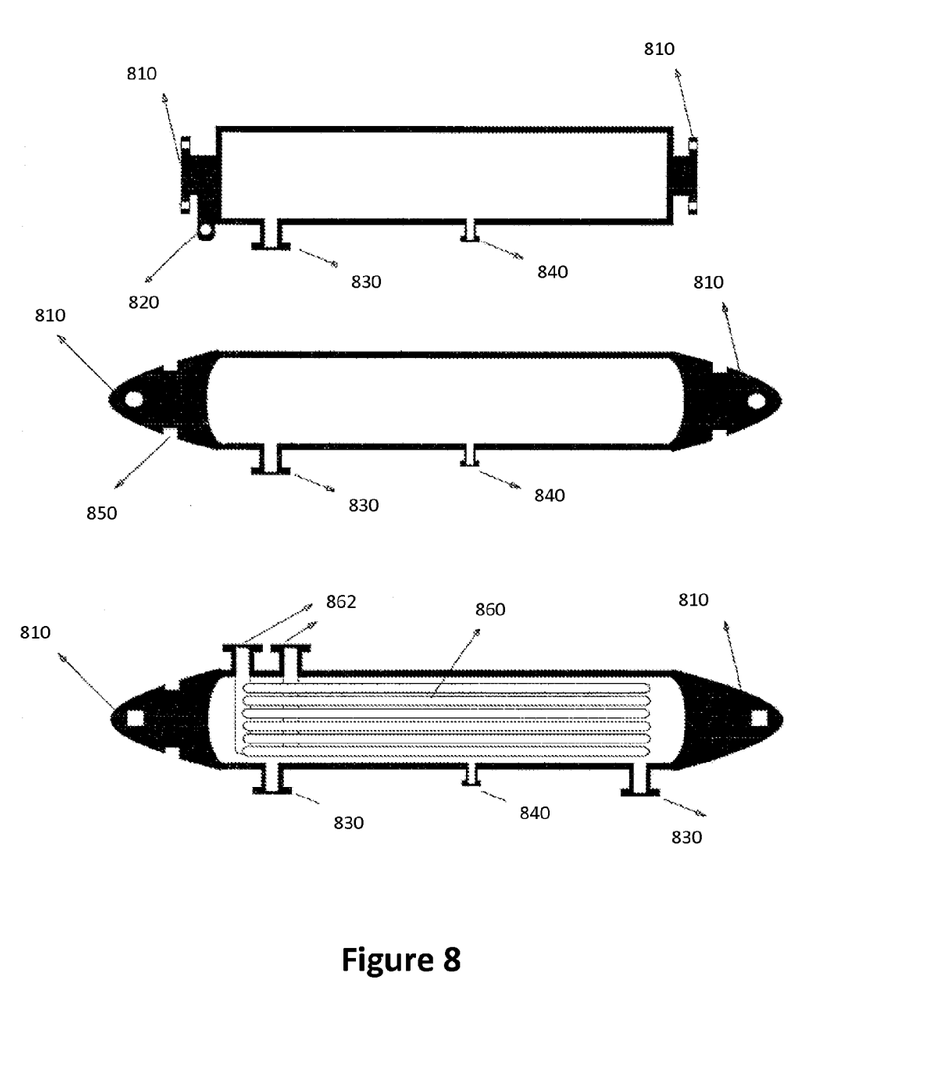
FIG. 8 illustrates different constructive pressure vessels that can be used in embodiments of the present invention.

In some embodiments, the constructive pressure vessels may be modified into a heat exchanger, passing the compressed air through the heat exchanger before it is going to the expander/turbine. An example thereof is shown in FIG. 8. In FIG. 8 exemplary vessels are shown. One example shows heads 810 to which other vessels can be connect, a lifting point for a pin device 820, an in and/or outlet 830 and a safety valve or burst disc 840. In another example the heads 810 are differently shaped and a groove type lifting point 850 for a clamping device is shown. In yet another example, a heat exchanger 860 is provided in the vessel and a heat exchanger in and/or outlet 862 is shown.

In some embodiments where a plurality of constructive pressure vessels are used, the diameter or average size in cross-section perpendicular to the length direction may differ between the different constructive pressure vessels. The diameter or average size may for example be lowering for constructive pressure values used higher in the substantially vertically oriented support structure. Also the thickness of the wall of the different constructive pressure vessels used may vary as function of their position in the support structure or their individual function.

Figure 9:
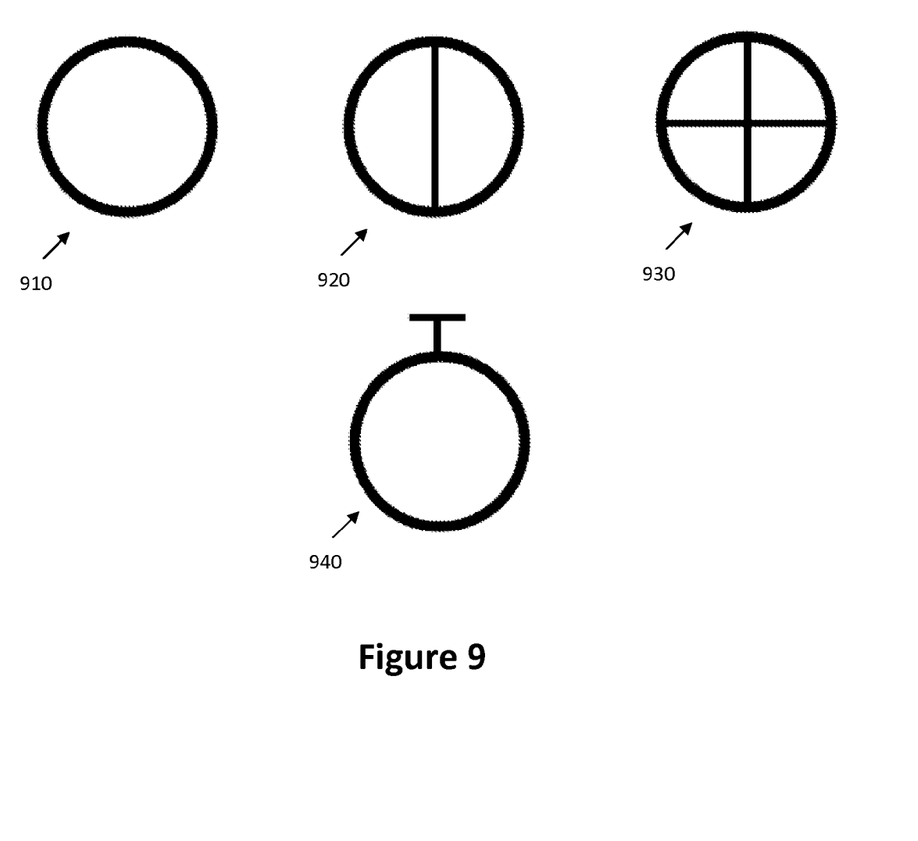
FIG. 9 illustrates cross-sectional views for constructive pressure vessels with additional supports, as can be used in embodiments of the present invention.

In some embodiments, the vessels may comprise an internal or external support. Examples of internal supports may be e.g. linear elements connecting two inner points of the pressure vessel, cross-shaped elements connecting more than two inner points of the pressure vessel. An example of an external support may be a T-shaped element connected to an outer point of the pressure vessel. Examples of internal and external supports are shown by way of example in FIG. 9. FIG. 9 shows cross-sectional views for different exemplary vessels. Different examples shown are a standard cross-section 910, a cross-section with an inner support 920, a cross-sections with cross-shaped inner support 930 and a cross-section with an outer support 940.

In some embodiments, the CPV-tower, assuming it would be located in an industrial zone with high demand on compressed air to drive all kind of equipment and machine, could store compressed air at a moment there is less demand on energy or compressed air, e.g. at night, and make it available during production hours to these facilities.

Although the constructive pressure vessel tower can work as a single unit, sometimes it may be more advantageous to work in clusters of multiple towers. This makes the use of a shared compressor and generator system possible, rendering the use of the compressor and generator more efficient, since it will reduce losses and increase the energy efficiency. Assuming that one pressure vessels tower would have a storage capacity equal to 0.5 MWh, if we have a cluster of 6 CPV towers, one can make up to 3 MWh available during peak periods and enjoy the higher electricity prices.

By way of illustration, embodiments of the present invention not being limited thereby, the energy storage capacity of a pressure vessel based tower of 100 m height, having 4 legs, having vessel diameters of about 1 meter and having a 3 MW generator in the nacelle are calculated. The energy storage capacity of course depends on the type of gas and the storage pressure used. For compressed air, stored at a pressure of 70 bar, the energy storage capacity is equivalent to 7 MWh. For compressed hydrogen gas stored at 10 bar, the energy storage capacity is equivalent to 10 MWh.

Although according to some embodiments, the constructive pressure vessels can form the mechanical structure of a wind tower, the constructive pressure vessels may be operated independently from the electricity generator in the wind tower. The energy required to drive the compressor or pumps when using the constructive pressure vessels as storage capacity for fluids, is coming either from the generator in the nacelle of tower (when a wind mill is used) or from the electricity grid. At some periods of a day the electricity cost is so low that it can be more cost efficient in using the electricity from the grid to store this energy in the CPV.

This will allow an economical use of the CPV even if it would be a longer period without wind. Suppose there is no wind, but plenty of sun, than this electricity could be used to drive the compressor, fills the CPV and at night when there would be no sun, the CPV volume will be released and converted into electricity.

It could even help to meet peak-demands, suppose there is sufficient wind at night during a low demand period, the power coming from the generator of the wind tower could be used to fill the CPV. At a peak period during the day, for example between 11:00 and 12:00, the CPV volume could be released and converted into electricity.

It is an advantage of embodiments of the present invention that a a flexible and highly responsive energy storage system can be provided.

By way of illustration, a system for controlling storage of energy is described in the table indicated below.

|  | Wind tower generator | Energy Source for CPV loading | Loading Time CPV | Release Time CPV |
| --- | --- | --- | --- | --- |
| Example 1 | On | Wind Tower | LP | PP - day |
| Example 2 | Off | Sun | PP | PP - evening |
| Example 3 | Off | Conventional (gas, nuclear) | LP | PP - anytime |
| Example 4 | On | Sun | LP | PP - anytime |

Peak period: PP I
Low period: LP

Figure 7:
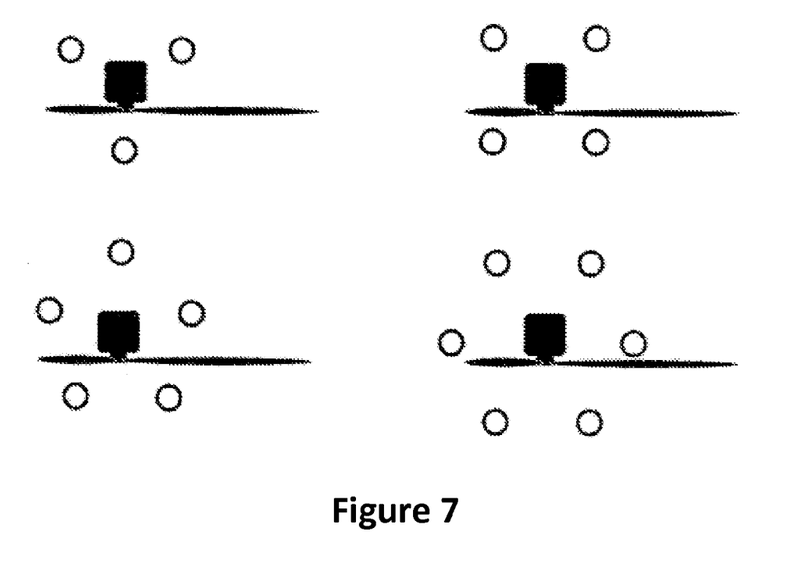
FIG. 7 illustrates an example of different constructive pressure vessel based towers having a different number of legs, according to embodiments of the present invention.

It is also an advantage of embodiments of the present invention that there is a possibility to adapt the storage capacity of the tower and that an easy control over the stability of the tower can be obtained. One can do this for example by the varying the number of legs of the tower structure during design, or even during use. During design, towers can e.g. be provided with a different number of legs, e.g. with between 3 legs and 8 legs, or even more legs if the footprint is large enough. Also, the number of legs can be determined as function of the foundation area. E.g. where there is bad foundation area, one can use more legs to build the tower. The number of towers in an energy cluster may than for example be chosen smaller but towers with more legs may be chosen. An illustration of some exemplary possibilities is shown in FIG. 7.

Figure 1:
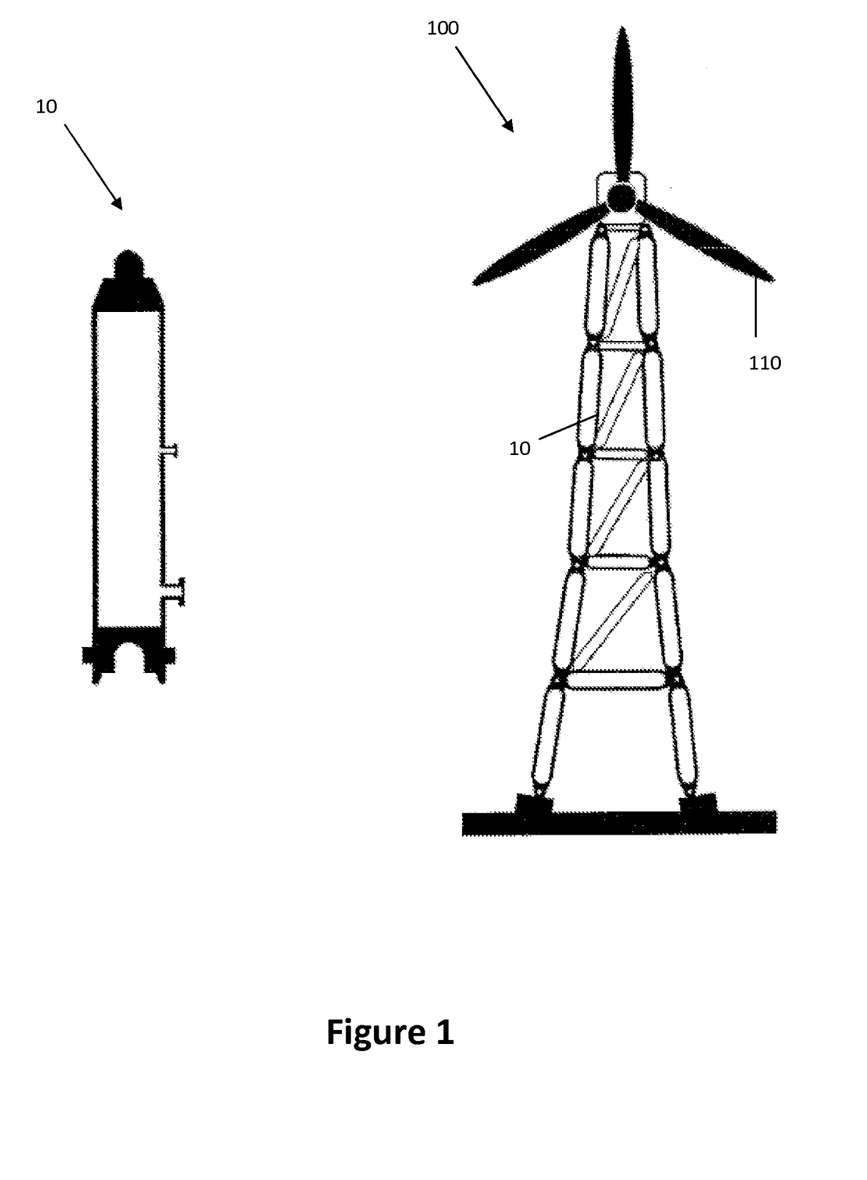
FIG. 1 illustrates a constructive pressure vessel based tower according to an embodiment of the present invention.
Figure 3:
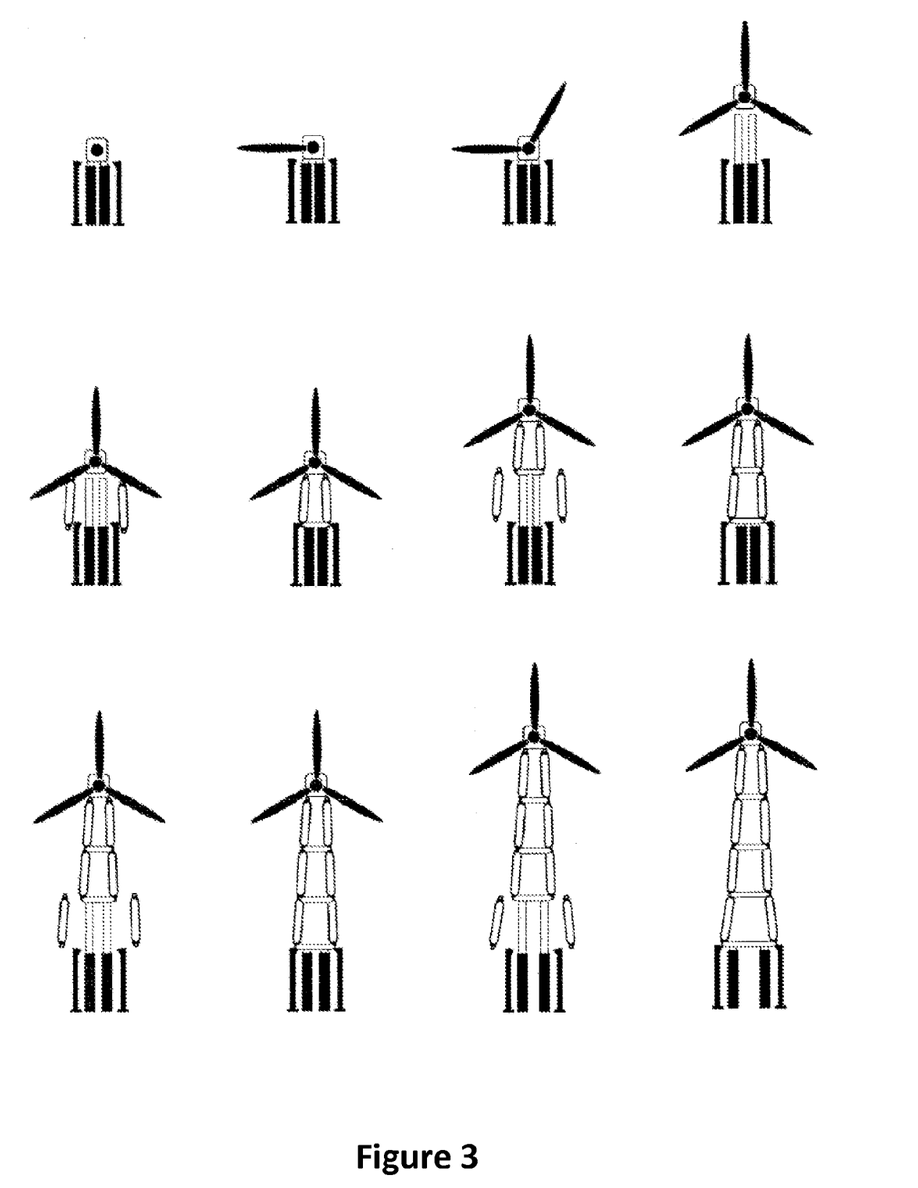
FIG. 3 and FIG. 4 illustrate methods for installing a constructive pressure vessel based tower according to embodiments of the present invention.

As indicated above, an advantageous method for providing a tower structure and a corresponding tower structure is provided made of constructive pressure vessels which combine the functionality of providing the mechanical structure for the tower and the functionality of storage capacity for a medium, e.g. a fluid, such as a liquid (water, a heat buffering liquid or electrolytes) or gas (air, hydrogen or artificial gas) in such vessels. An example of such a construction is given by way of illustration in FIG. 1. FIG. 1 illustrates a constructive pressure vessel 10 and a tower structure 100 built from constructive pressure vessels 10. In the present case, the tower structure is an illustration of a wind mill, whereby the blades 110 of the rotor for the windmill are shown The method for providing, i.e. manufacturing such a tower, may be a top-bottom construction as well as a bottom-top construction. In other words, in one embodiment the method of manufacturing a tower structure based on constructive pressure vessels may be by pushing the tower structure upwards during construction and add new constructive pressure vessel elements at the bottom side of the tower. The latter is different from the usual way of manufacturing which is building or stacking the tower from bottom to top. The particular way of constructing even makes it possible to attach the rotor blades near the ground and not as usual lift the nacelle and the rotor blades to the top, which can be as high as 100 meters or more. Such a way of construction may be less complex, less dangerous and handling may be performed in a more easy way. Such an embodiment may especially advantageous when high towers are to be manufactured. An example of such a construction is shown in FIG. 3. It is to be noticed that the height of the towers that can be produced in such a way is not limited by the height of the cranes that are available but that higher towers also can be made.

Figure 4:
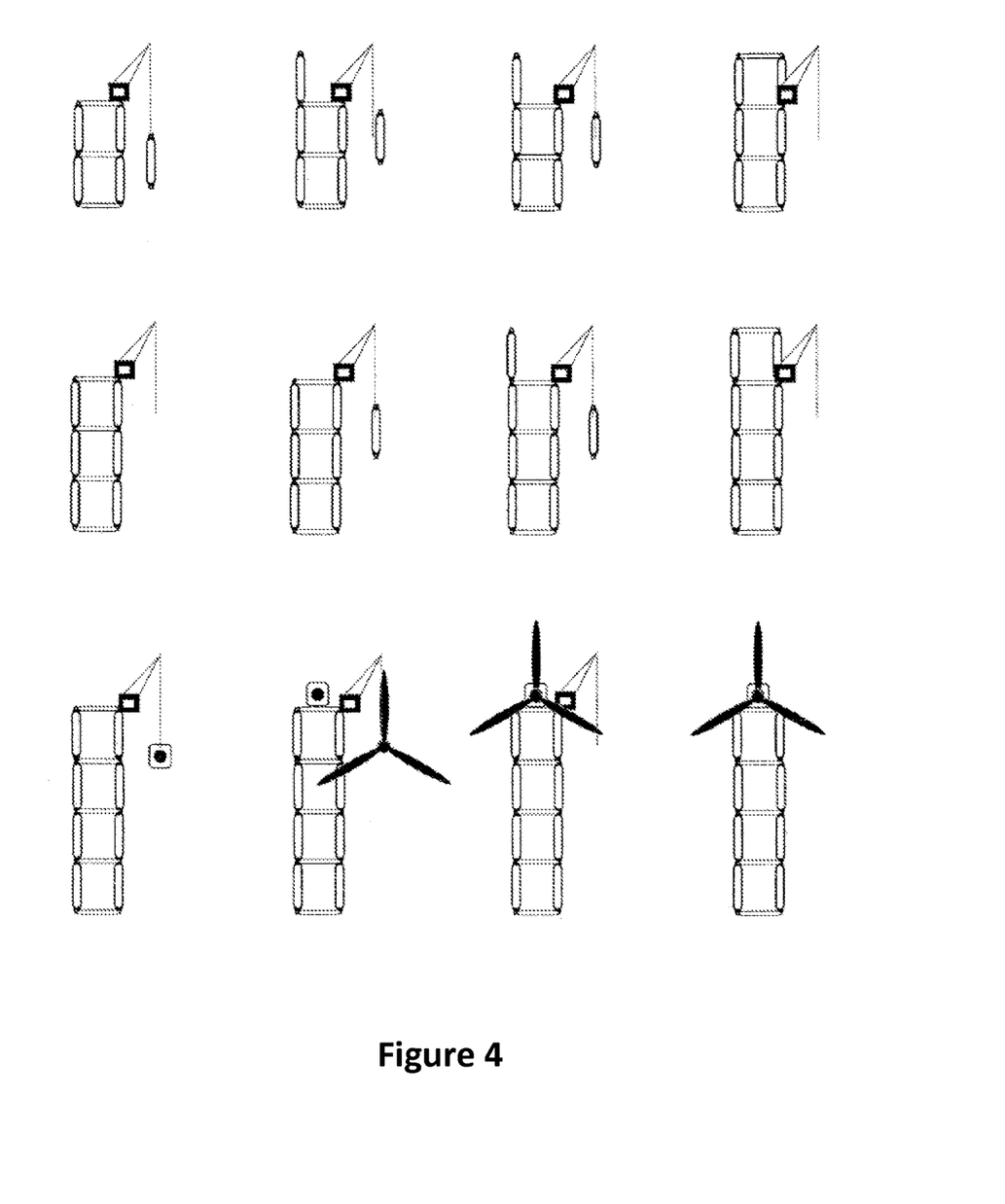

Nevertheless, embodiments of the present invention also enclose a more classical order of building the tower, i.e. from bottom to top, like this is done for example in tall buildings construction using a crane that lifts itself upwards. An example of such a construction method is by way of example shown in FIG. 4.

In both methods for constructing described above, the parts need to be first transferred to the location where the tower is to be build. It thereby is an advantage of embodiments of the present invention that the parts are easy transportable since the CPV units can be made in such design that they not exceed the sizes of regular truck trailers, typically having a length 13 meter and a width of 2.55 meter.

The invention claimed is:

1. A tower structure with storing capacity for at least one medium, the tower structure comprising at least two substantially vertically oriented support structures for forming the tower structure, wherein
    at least one of the support structures comprises at least one constructive pressure vessel for forming the support structure, and
    said at least two substantially vertically oriented support structures are interconnected with interconnecting beams;
    wherein the tower structure is a wind mill and/or a solar thermal tower.

2. The tower structure according to claim 1, wherein the tower structure comprises at least 6 substantially vertically oriented support structures.

3. The tower structure according to claim 1, wherein the at least one constructive pressure vessel is a load bearing element forming the at least one support structure.

4. The tower structure according to claim 1, wherein the interconnecting beams are formed of one or more constructive pressure vessels.

5. The tower structure according to claim 1, wherein at least one constructive pressure vessel is heat insulated.

6. The tower structure according to claim 1, wherein at least one constructive pressure vessel comprises a heat exchanger.

7. An energy storage system comprising:
    a tower structure with storing capacity for at least one medium, the tower structure comprising at least two substantially vertically oriented support structures for forming the tower structure, wherein at least one of the support structures comprises at least one constructive pressure vessel for forming the support structure, and said at least two substantially vertically oriented support structures are interconnected with interconnecting beams such that the tower structure is a wind mill and/or a solar thermal tower, and
    a compressor for storing compressed air in the tower structure.

8. The energy storage system according to claim 7, wherein the compressor is at least partly powered by wind mill energy from the wind mill or by solar power from the solar thermal tower.

9. The energy storage system according to claim 7, wherein the system comprises a pumping means, and a water turbine generator.

10. The energy storage system according to claim 9, wherein at least the pumping means is at least partly powered by wind mill energy from the wind mill or solar power from the solar thermal power.

11. The energy storage system according to claim 7, wherein the system comprises an external heat exchanging means.

12. A method for constructing a tower structure with storing capacity for at least one medium, the method comprising provivding a plurality of constructive pressure vessels forming at least two substantially vertically oriented support structures using the constructive pressure vessels, at least one of the support structures comprising at least one constructive pressure vessel for forming the support structure, and interconnecting the at least two substantially vertically oriented support structures for forming the tower structure;

wherein the tower structure is a wind mill and/or a solar thermal tower.

13. The method according to claim 12, wherein forming at least two substantially vertically oriented support structures comprises fixedly mounting a number of constructive pressure vessels to each other.

14. The method according to claim 13, wherein fixedly mounting comprises placing constructive pressure vessels on top of already positioned constructive pressure vessels.

15. The method according to claim 14, wherein fixedly mounting comprises lifting already positioned constructive pressure vessels and positioning a further constructive pressure vessel under the lifted constructive pressure vessels and thereafter connecting the constructive pressure vessels.

* * * * *